(12) United States Patent
Jones et al.

(10) Patent No.: US 11,884,342 B2
(45) Date of Patent: Jan. 30, 2024

(54) CAST-IN TRACK SYSTEM COMPONENT BUSHING

(71) Applicant: Caterpillar Inc., Deerfield, IL (US)

(72) Inventors: Benjamin I. Jones, Bartonville, IL (US); Benoit Abello, Dunlap, IL (US); David J. Hakes, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 1155 days.

(21) Appl. No.: 16/163,465

(22) Filed: Oct. 17, 2018

(65) Prior Publication Data
US 2020/0124096 A1 Apr. 23, 2020

(51) Int. Cl.
| | | |
|---|---|---|
| *B62D 55/21* | (2006.01) | |
| *B22D 19/04* | (2006.01) | |
| *B62D 55/088* | (2006.01) | |
| *B62D 55/32* | (2006.01) | |
| *F16C 17/02* | (2006.01) | |
| *F16C 33/08* | (2006.01) | |
| *F16C 35/02* | (2006.01) | |

(52) U.S. Cl.
CPC ............. *B62D 55/21* (2013.01); *B22D 19/04* (2013.01); *B62D 55/0887* (2013.01); *B62D 55/32* (2013.01); *F16C 17/02* (2013.01); *F16C 33/08* (2013.01); *F16C 35/02* (2013.01); *F16C 2220/06* (2013.01)

(58) Field of Classification Search
CPC .... B22D 19/04; B62D 55/0887; B62D 55/21; B62D 55/32; F16C 17/02; F16C 33/08; F16C 35/02
See application file for complete search history.

(56) References Cited

U.S. PATENT DOCUMENTS

| | | | |
|---|---|---|---|
| 1,306,178 A | 6/1919 | French | |
| 2,368,611 A * | 1/1945 | Charnock | B62D 55/0887 |
| | | | 37/457 |
| 3,169,807 A * | 2/1965 | Abel | F16C 32/0618 |
| | | | 384/108 |

(Continued)

FOREIGN PATENT DOCUMENTS

| | | |
|---|---|---|
| CN | 105473430 | 4/2016 |
| CN | 105473432 | 4/2016 |

(Continued)

OTHER PUBLICATIONS

"International Application Serial No. PCT/US2019/055883, International Search Report dated Jan. 10, 2020", 5 pgs.

(Continued)

*Primary Examiner* — Jason R Bellinger
*Assistant Examiner* — Emily G. Castonguay

(57) ABSTRACT

A component for a track-type machine comprises a body, a through-bore extending through the body forming an inner wall, and a bushing located in the through-bore. The bushing comprises a bearing surface, an outer surface engaging the inner wall, a flange extending from the outer surface and extending into the inner wall, and retention features located in the outer surface proximate the flange. The retention features comprise voids in the bushing filled-in by material of the body. Methods of manufacturing a component for a track-type system comprises casting-in-place a bushing with a flange and retention features into the component.

20 Claims, 7 Drawing Sheets

(56) References Cited

U.S. PATENT DOCUMENTS

| | | |
|---|---|---|
| 9,751,577 B2 | 9/2017 | Dertley |
| 2005/0088042 A1 | 4/2005 | Hisamatsu |
| 2008/0265667 A1 | 10/2008 | Livesay |
| 2010/0148575 A1* | 6/2010 | Johannsen ............ B62D 55/21 |
| | | 305/201 |
| 2011/0252851 A1* | 10/2011 | Lu ............................ B24C 1/10 |
| | | 72/53 |
| 2013/0169034 A1* | 7/2013 | Hisamatsu ......... B62D 55/0887 |
| | | 384/139 |
| 2015/0061370 A1* | 3/2015 | Akinlua ............ B62D 55/0887 |
| | | 305/104 |
| 2015/0361534 A1* | 12/2015 | Amada .................. C22C 38/44 |
| | | 305/201 |
| 2016/0052571 A1 | 2/2016 | Ellmann |
| 2016/0084302 A1* | 3/2016 | Spinella .................. F16C 35/02 |
| | | 384/297 |
| 2017/0057572 A1 | 3/2017 | Hakes et al. |
| 2018/0037280 A1 | 2/2018 | Nott |

FOREIGN PATENT DOCUMENTS

| | | | | |
|---|---|---|---|---|
| DE | 19642666 A1 | * | 10/1997 | ............ B60S 1/0425 |
| DE | 102008020330 A1 | * | 10/2009 | ............. F16C 33/08 |
| KR | 20130086767 | | 8/2013 | |

OTHER PUBLICATIONS

"International Application Serial No. PCT/US2019/055883, Written Opinion dated Jan. 10, 2020", 7 pgs.

Chinese Office action for Chinese Appln. No. 201980066657.9, dated Jun. 30, 2023 (4 pgs).

* cited by examiner

CAST-IN TRACK SYSTEM COMPONENT BUSHING

TECHNICAL FIELD

The present application relates generally, but not by way of limitation, to track system components incorporated in or used with track-type treads used in various types of tractors, bulldozers, backhoes, excavators, motor graders, mining trucks, and other construction and agricultural machinery. More particularly, the present application relates to bushings used in track shoes that can engage with pins used to couple adjacent track shoes.

BACKGROUND

Machines incorporating track-type treads used in mining, construction, agriculture, and the like are supported on an undercarriage assembly that can have one or more continuous track-type treads or "continuous tracks" that enable the machine to traverse the ground or terrain. The continuous track can include a plurality of track links that are pivotally joined or linked together by pins, for example, and that are arranged in a continuous loop or belt similar to a closed chain. The continuous track can also include track shoes or track pads disposed thereon to engage the ground. The continuous track is disposed around a plurality of wheels, idlers and/or rollers arranged along a lower side of the machine and the track can be made to translate about the wheels or rollers with respect to the machine by a drive sprocket operatively coupled to a prime mover. The hinged connection between the individual track links enables the continuous track to articulate, e.g., flex or bend, as it moves in a loop about the plurality of rollers and thereby bringing the track shoes into engagement with the ground.

An advantage of continuous tracks is that they can better support and distribute the weight of the machine due to the fact the continuous track provides more surface contact with the ground and thus better traction, as compared with other forms of propulsion such as pneumatic tires or wheels. Accordingly, continuous tracks can better traverse soft or loose soil or other materials without becoming stuck or spinning. In addition, the improved traction can facilitate climbing capability or the ability to drive along steep grades in the work surface. Further, because the individual track shoes and links are often made of steel, continuous tracks are typically more durable than pneumatic tires or the like.

To facilitate articulation of the track links so that the continuous track translates about the rollers and drive sprocket, the individual links can be joined by an appropriately designed track joint assembly. The track joint assembly can comprise a bearing or bushing to facilitate pivoting of coupled track shoes at a pin while resisting wear.

Korean Publication No. KR 20130086767A to Doosan Infracore, entitled "Bushing with Flange and Manufacturing Method Thereof." discloses a bushing having a flange located at an end of the bushing via threaded engagement for use in an excavator.

SUMMARY OF THE INVENTION

A track shoe can comprise a base extending along a transverse direction and a first link extending along the base in a longitudinal direction. The first link can comprise a body connected to the base comprising a first longitudinal wall and a second longitudinal wall, a through bore extending from the first longitudinal wall to the second longitudinal wall, a channel positioned in the through bore between the first longitudinal wall and the second longitudinal wall, and a bushing located in the through bore, the bushing including a flange positioned in the channel.

A component for a track-type machine can comprise a body, a through bore extending through the body and including an inner wall and a bushing located in the through bore. The bushing can comprise an inner bearing surface, an outer surface engaging the inner wall, a flange extending from the outer surface and extending into the inner wall, and retention features located in the outer surface proximate the flange, wherein the retention features comprise voids in the bushing filled-in by material of the body.

A method of manufacturing a track system component including a bushing can comprise positioning a bushing into a track system component mold, the bushing including on outer diameter flange, filling the track system component mold with a track system component material to form a track system component around the bushing, and removing the track system component mold from the track system component.

DETAILED DESCRIPTION

Figure 1:
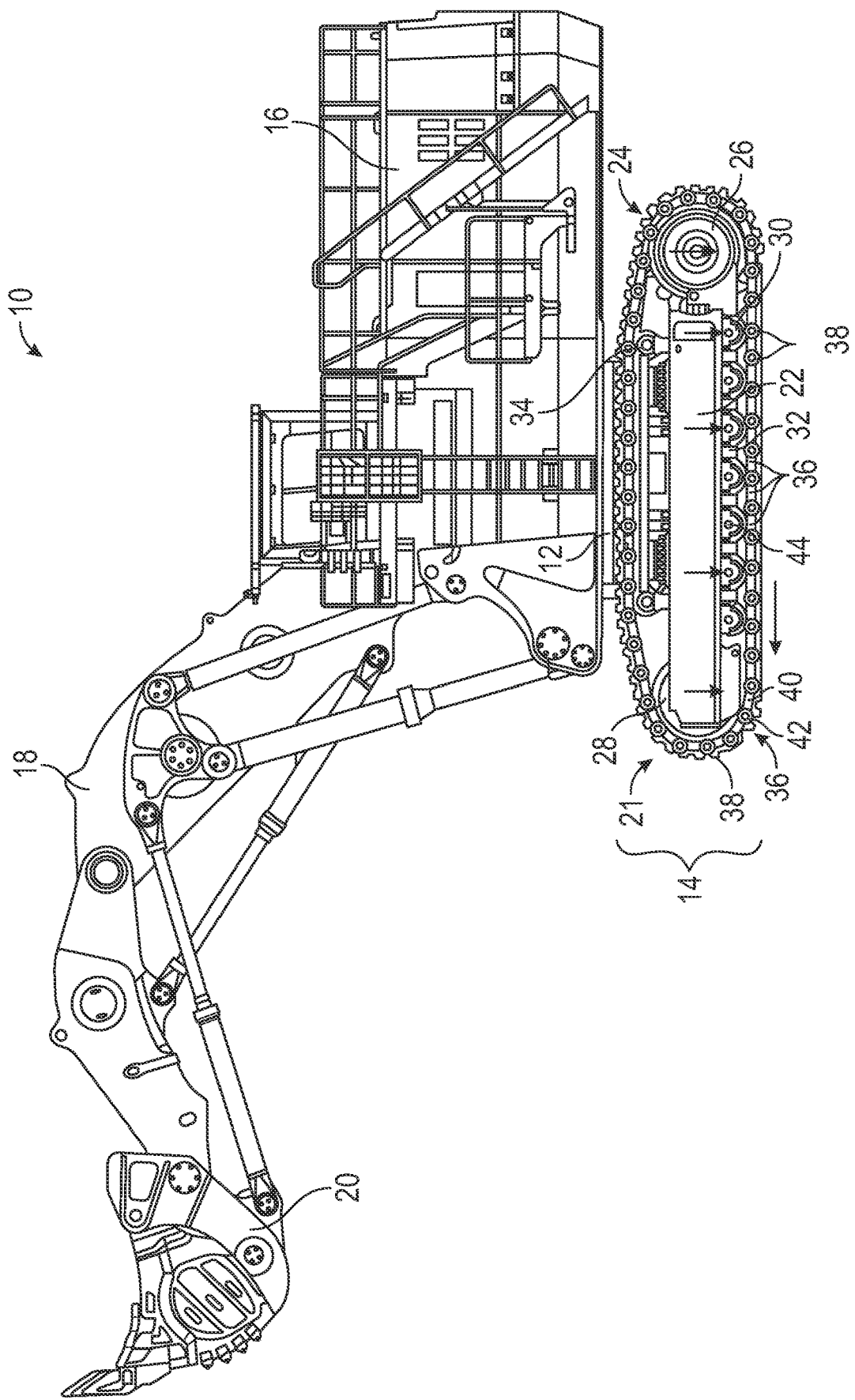
FIG. 1 is a schematic side view of a machine comprising a chassis having an undercarriage system with a track system according to the present disclosure.

FIG. 1 is a schematic side view of machine 10 comprising chassis 12 having undercarriage system 14 according to the present disclosure. Machine 10 may be any type of machine that includes a tracked undercarriage system. In the example shown in FIG. 1, machine 10 is an excavator comprising superstructure 16 pivotally supported from chassis 12. In this embodiment, machine 10 can include implement 18, which may have excavating bucket 20 attached thereto for digging. Machine 10 may alternatively be another type of machine, including, but not limited to, a track-type tractor.

Undercarriage 14 may be configured to support machine 10 from and move along the ground, roads, and/or other types of terrain. Undercarriage 14 can comprise track system 21 comprising track roller frame 22, various guiding components connected to track roller frame 22, and endless track 24 engaging the guiding components. The guiding components of undercarriage 14 can comprise drive sprocket 26, idler 28, rollers 30, track guide 32 and carrier 34.

Track 24 can comprise link assemblies 36 that can form a flexible backbone of track 24. Link assemblies 36 can comprise a plurality of track shoes 38 joined by a plurality of links 40 connected to one another at pivot joints 42. In FIG. 1, only half of links 40 can be seen. For each link 40 visible in FIG. 1, each link assembly 36 can include a corresponding laterally spaced link 40 (located further into the plane of FIG. 1). Link assemblies 36 can extend in an endless chain around drive sprocket 26, rollers 30, idler 28, and carrier 34. Track shoes 38 can be located at the perimeter of link assemblies 36. For example, track 24 can include shoes 38 attached to, or integral with, the outside surface of each laterally spaced pair of links 40.

Rollers 30 and track guide 32 can guide the lower portion of track 24. Rollers 30 can each be suspended beneath track roller frame 22. For example, rollers 30 can be rotationally supported on axles 44 coupled to track roller frame 22. The undersides of rollers 30 can ride on and guide links 40 in the lower portion of the endless chain formed by link assemblies 36. Track guide 32 can also be suspended from track roller frame 22. Track guide 32 can extend adjacent sides of links 40 in the lower portion of the endless chain formed by link assemblies 36, thereby further guiding this portion of link assemblies 36.

Figure 2:
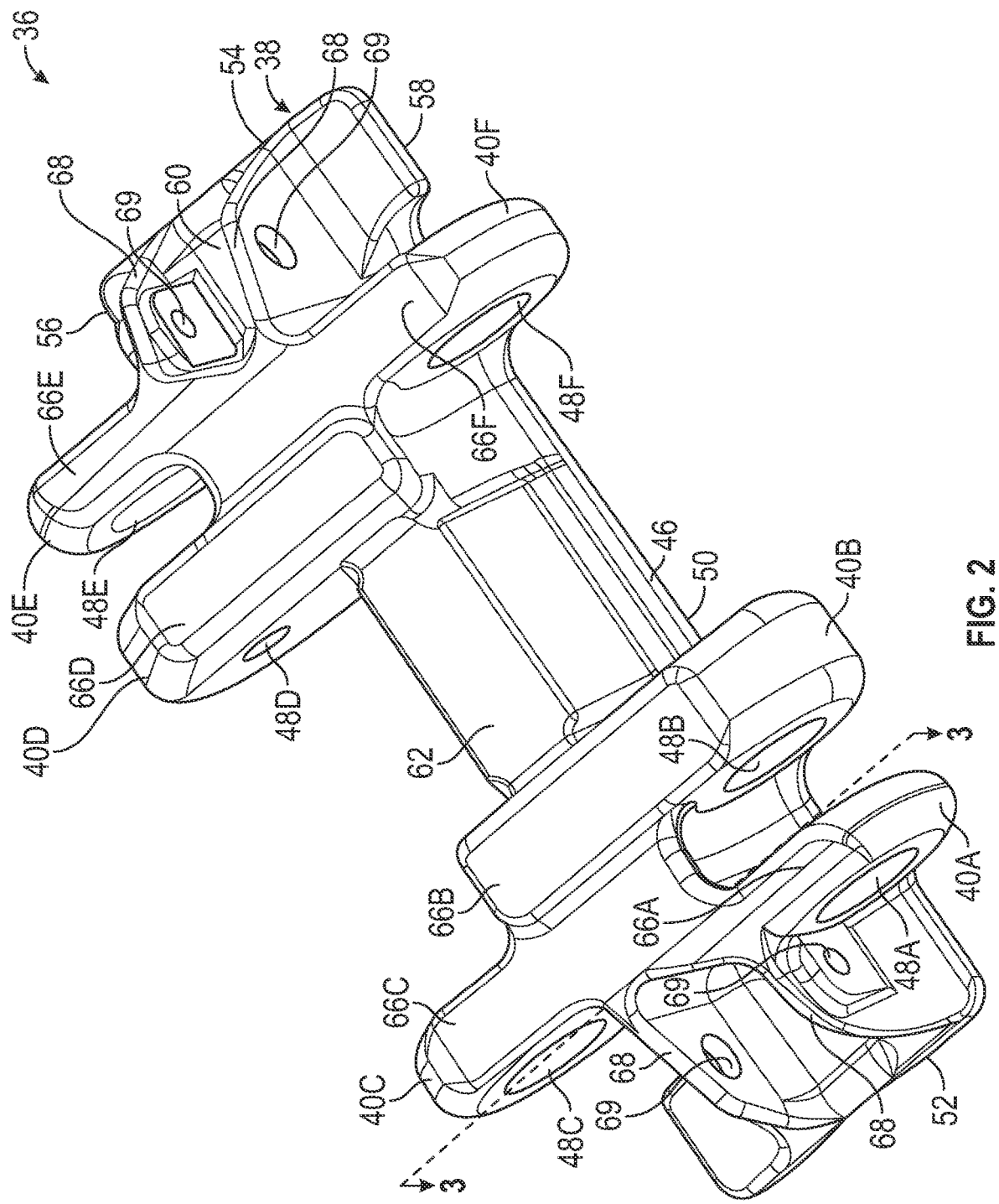
FIG. 2 is a perspective view of a track shoe for use in the track system of the machine of FIG. 1 including a bushing of the present disclosure.

Carrier 34 can guide the upper portion of track 24, such as by extending upward from track roller frame 22 and engaging a portion of link assemblies 36 in an upper portion of its endless chain. Carrier 34 can have various configurations. As shown in FIG. 2, in the illustrated embodiment, carrier 34 can comprise a skid on which link assemblies 36 ride. In addition to or instead of skids, carrier 34 can include rollers on which link assemblies 36 ride.

Drive sprocket 26 and idler 28 can guide the end portions of the loop of track 24. Drive sprocket 26 and idler 28 can be suspended from opposite ends of track roller frame 22. The ends of the loop formed by link assemblies 36 can wrap around drive sprocket 26 and idler 28. One or more portions of drive sprocket 26 can project into spaces between laterally spaced pairs of links 40. One or more portions of idler 28 may also project into spaces between laterally spaced pairs of links 40. Drive sprocket 26 and idler 28 can rotate about lateral axes to guide the ends of link assemblies 36 through approximately semicircular paths between the lower and upper portions of the endless chain formed by the link assemblies 36. Additionally, because they extend into spaces between laterally spaced pairs of links 40, sprocket 26 and idler 28 can guide link assemblies 36 in lateral directions. Sprocket 26 can be rotated by an external power source (e.g., a prime mover within superstructure 16 not shown) to move one end of link assemblies 36 between the top and bottom stretches. Driven by sprocket 26, link assemblies 36 can, in turn, rotate idler 28 and rollers 30 around their rotation axes. Drive sprocket 26 can be located adjacent the ground at a height approximately the same as idler 28. Alternatively, in some embodiments, drive sprocket 26 may be elevated significantly above the ground at a height significantly higher than idler 28. For example, drive sprocket 26 may be positioned above track roller frame 22.

Track guide 32 and track guide 34 may help guide the end of track 24 adjacent idler 28. If track 24 should separate from rollers 30, track guide 34 can help guide track 24 back into proper engagement with rollers 30. Track guide 34 can extend down beside link assemblies 36 adjacent idler 28. Track guide 34 can extend from track roller frame 22 adjacent a side of links 40 as they extend around idler 28. Thus, track guide 34 can help keep link assemblies 36 properly aligned laterally as they extend around idler 28.

Various components of track system 21 can include features to facilitate rotation on their respective axle, pin or the like. Such components can include sprocket 26, idler 28, rollers 30 and track shoes 38. Such features can comprise bushings that facilitate rotation with reduced friction and wear. These bushings can be manufactured-in-place with retention or engagement features to facilitate bonding or coupling of the bushing with the track system component.

FIG. 2 is a perspective view of track shoe 38 comprising base 46, links 40A-40F and through bores 48A-48F. As discussed below, track shoe 38 can incorporate a bushing of the present disclosure that be cast-in-place within track shoe 38 and that can incorporate features to inhibit or prevent displacement of the bushing from track shoe 38. Although described with reference to track shoe 38, bushings of the present disclosure can be used in other components used in track 24 (FIG. 1) or undercarriage system 14, such as drive sprocket 26, idler 28 or rollers 30.

Base 46 can comprise a substantially rectangular outer or bottom surface 50. Base 46 can be defined in a lateral or transverse direction by a left side surface 52 and right side surface 54, and in a longitudinal direction by front surface 56 and rear surface 58. Base 46 can extend in the transverse direction across idler 26 and sprocket 28 and can be configured to roll against rollers 30 in the longitudinal direction. Base 46 can comprise a ground-engaging portion of track shoe 38 and, in example, can be configured to receive track pads. Inner or top surface 60 of base 46 can provide surface area for connection with links 40A-40F.

Links 40A-40F can extend along or from base 46 in a longitudinal direction that is substantially perpendicular to the transverse direction. Links 40A, 40B and 40F can extend from base 46 beyond rear surface 58. Links 40C, 40D and 40E can extend from base 46 beyond front surface 56. It will be appreciated that the terms "left," "right," "front," and "rear" are used herein for the purpose of illustration to designate the respective sides of base 46 or track shoe 58 and are not limiting.

Links 40A-40F can be configured such that the two opposite sides in the longitudinal direction, e.g., front side 56 and rear side 58, are complementary to each other. In other words, link 40C is configured to engage with links 40A and 40B of another track shoe 38 disposed directly in front of track shoe 38 of FIG. 2. Likewise, links 40D and 40E are configured to engage with link 40F of another track shoe 38 disposed directly in front of track shoe 38 of FIG. 2.

Adjacent track shoes 38 can be coupled via pins, such as at pivot joints 42 of FIG. 1, inserted into through bores 48A-48F. For example, a first pin can be inserted through bores 48C, 48D and 48E of track shoe 38 of FIG. 2 and through bores 48A, 48B and 48F or another track shoe 38 disposed there-in-front, while a second pin can be inserted through bores 48A, 48B and 48F of track shoe 38 of FIG. 2 and through bores 48C, 48D and 48E or another track shoe 38 disposed there-behind. As such, adjacent track shoes 38 can be pivotably coupled, such as at pivot points 42 of FIG. 1, such that they are rotatable with respect to each other about a rotation axis comprising bushing axis $A_B$ (see FIG. 3) defined by the links 40A-40F and or pins.

Projection 62 can be provided at the center of base 46 of each track shoe 38, which can form an engagement portion together with another such projection 62 of a neighboring track shoe 38. A tooth of drive sprocket 26 (FIG. 1) can engage with the engagement portion to drive track 24 (FIG. 1) formed by track shoes 38.

Links 40C, 40D and 40E can be arranged spaced apart from each other in the transverse direction. Link 40C can be provided on one side (the left side with reference to FIG. 2) and links 40D and 40E can be provided on the opposite (the right side with reference to FIG. 2) with respect to the transverse center of track shoe 38. Link 40D can include rectangular running surface 66D that is formed on the upper side of link 40D and on which an idler or rollers 30 can roll during movement of track 24.

Links 40A, 40B and 40F can be arranged spaced apart from each other in the transverse direction. Links 40A and 40B can be provided on one side (the left side with reference to FIG. 2) and link 40F can be provided on the opposite (the right side with reference to FIG. 2) with respect to the transverse center of track shoe 38. Link 40B can include rectangular running surface 66B that is formed on the upper side of link 40B and on which an idler or rollers 30 can roll during movement of track 24.

Reinforcement ribs 68 can be provided on track shoe 38 to provide reinforcement to base 46 along sides 52 and 54. Reinforcement ribs 68 can be formed such that they extend upwards from left side surface 52 and right side surface 54 and then extend inwards to merge with an upper side of links 40A, 40C, 40E and 40F. Ribs 68 on each side surface 52 and 54 can be spaced apart from each other. Ribs 68 can include bores 69 for receiving a fastener for retaining a pin, such as pin of pivoting joint 42, within through bores 48A-48F.

As mentioned, pins, such as at pivoting joints 42, can be inserted into through bores 48A-48F to pivotably couple adjacent track shoes 38. In order to allow for a smooth rotation of track shoes 38 with respect to each other, ends of links 40A-40F can be rounded-off, while corresponding recesses are formed in the rear sides of the same. The upper sides of connecting portions 40A, 40C, 40E and 40F can be recessed with respect to the upper sides of portions 40A, 40C, 40E and 40F having running surfaces 66A, 66C, 66E and 66F, respectively, such that, during movement of track 24, running surfaces 66A, 66C, 66E and 66F do not come into contact with rollers 30 or other idlers.

As discussed below, track shoe 38 can comprise a bushing, e.g., bushing 70 of FIG. 3, to facilitate rotation of track shoes 38 about pivot joints 42. The bushings can provide reduced friction between track shoes 38 and pivot joints 42, thereby reducing wear. In many conventional designs, bushings are inserted into through bores of the links after the track shoe is manufactured. In such configurations, the bushing and through bore are configured with an interference fit. However, in some configurations, particularly in large sized track shoes that can be used in hydraulic mining shovels, the load that would be required to retain the bushing in the track shoe during operation of the machine can exceed the interference fit capabilities. Bushings of the present application can overcome these issues by, for example, being cast-in-place within the track shoe and including retention features to facilitate bonding of the track shoe with the bushing.

Figure 3:
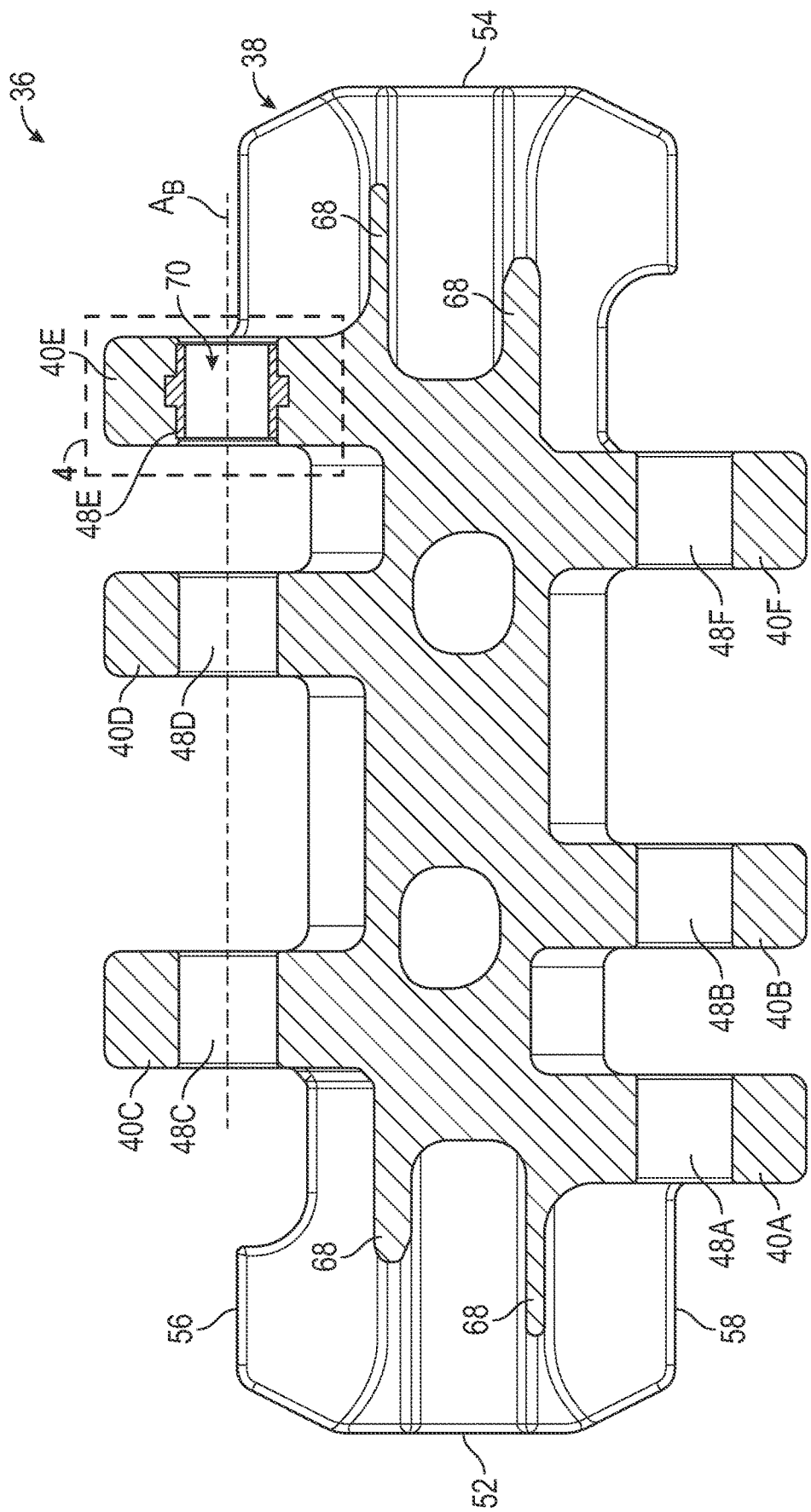
FIG. 3 is a top, cross-sectional view of the track shoe of FIG. 2 showing the position of a bushing within a link of the track shoe.
Figure 4:
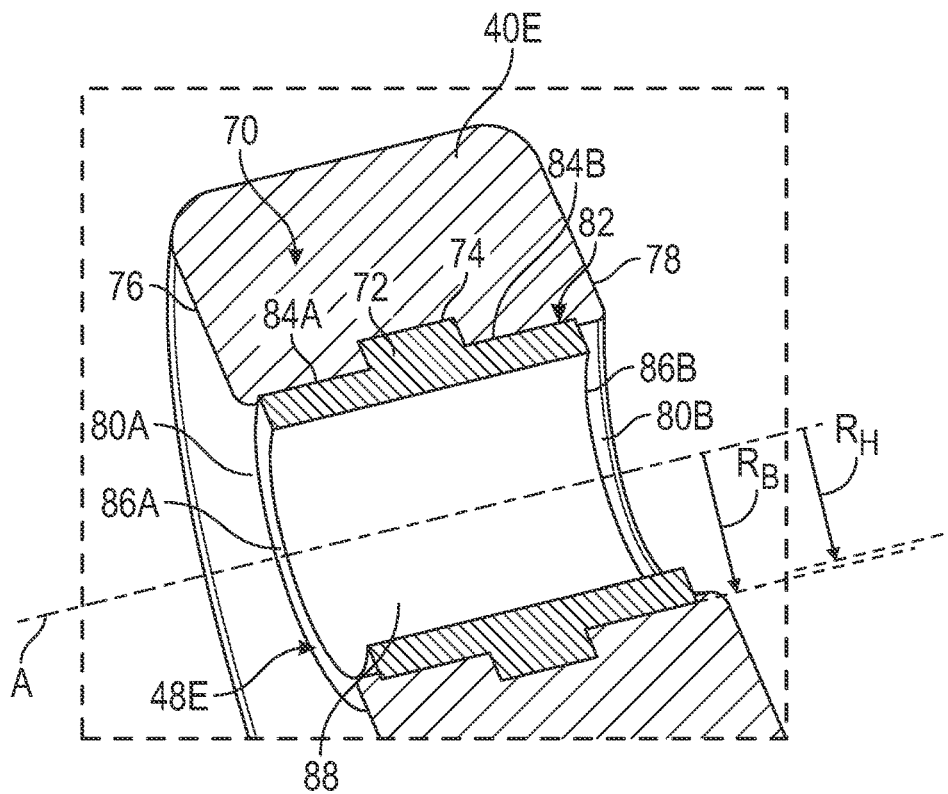
FIG. 4 is a perspective, cross-sectional view of the bushing and link of FIG. 3 showing a flange of the bushing extending into a channel in the track shoe.

FIG. 3 is a top, cross-sectional view of track shoe 38 of FIG. 2 showing the position of bushing 70 within link 40E of track shoe 38. FIG. 4 is a perspective, cross-sectional view of bushing 70 and link 40E of FIG. 3 showing flange 72 of bushing 70 extending into channel 74 in through bore 48E of link 40E. FIG. 4 is a close-up view of callout 4 of FIG. 3. In addition to link 40E and through bore 48E, track shoe 38 can include all of the elements recited with reference to FIG. 2 and are not repeated here for brevity. FIGS. 3 and 4 are discussed concurrently.

Although FIG. 3 only shows link 40E including bushing 70, each of links 40A-40F can be provided with a bushing as is described herein, such as one similar to bushing 70. Through bore 48E can comprise a hole or opening in link 40A that can extend from first longitudinal wall or surface 76 to second longitudinal wall or surface 78. Through bore 48E can included rounded edges, or fillets, 80A and 80B to remove or avoid sharp edges at surfaces 76 and 78. As indicated in FIG. 3, the diameter of bushing 70 can be slightly larger than the diameter of through bore 74 because, as discussed below, material of track shoe 38 can extend into bushing 70, and vice versa.

Bushing 70 can include outer wall 82 from which flange 72 can extend. Outer wall 82 can comprise an engagement surface for engaging a wall of through bore 48E. Outer wall 82 can include first portion 84A and second portion 84B that can be disposed on either side of flange 72. Outer wall 82 can extend between first end 86A and second end 86B. Bushing 70 can also comprise inner wall or bearing surface 88. Inner bearing surface 88 and outer wall 82 can extend between first end 86A and second end 86B. Flange 72 can be located within channel 74 to prevent or inhibit bushing 70 from being displaced within through bore 48E along bushing axis $A_B$. Additionally, as discussed below with reference to FIGS. 5-8, outer wall 82 can include retention or engagement features, such as three-dimensional depressions, to facilitate bonding or integration of bushing 70 into track shoe 38.

Flange 72 can extend radially outwardly from outer wall 82 at a central or medial location on outer wall 82. Flange 72 can be integral with the other portion of bushing 70 formed between first end 86A and second end 86B so as to, for example, prevent weakening of mechanical joints that might be used to couple a flange to the bushing under loading. In an example, flange 72 can be located halfway across the width of outer wall 82 centrally between first end 86A and second end 86B. However, in other embodiments, flange 72 can extend from outer wall 82 at any medial location between first end 86A to second end 86B, or at ends 86A and 86B.

Flange 72 can have a rectilinear cross-sectional area, such as square or rectangular. In the example shown, flange 72 has a rectangular cross-section with a major axis extending parallel to bushing axis $A_B$. However, in other embodiments, flange 72 can have other shapes.

As shown in FIG. 4, bushing outer wall 82 can have bushing radius $R_B$ and through bore 78E can have hole radius $R_H$. Hole radius $R_H$ can be slightly smaller than bushing radius $R_B$, such as on the order of 0.2 mm. Such a construction can be formed by inclusion of retention features, such as three-dimensional depressions, in first portion 84A and second portion 84B of outer wall 82 that promote influx of material of track shoe 38 into bushing 70 during a manufacturing process, such as casting.

Figure 5:
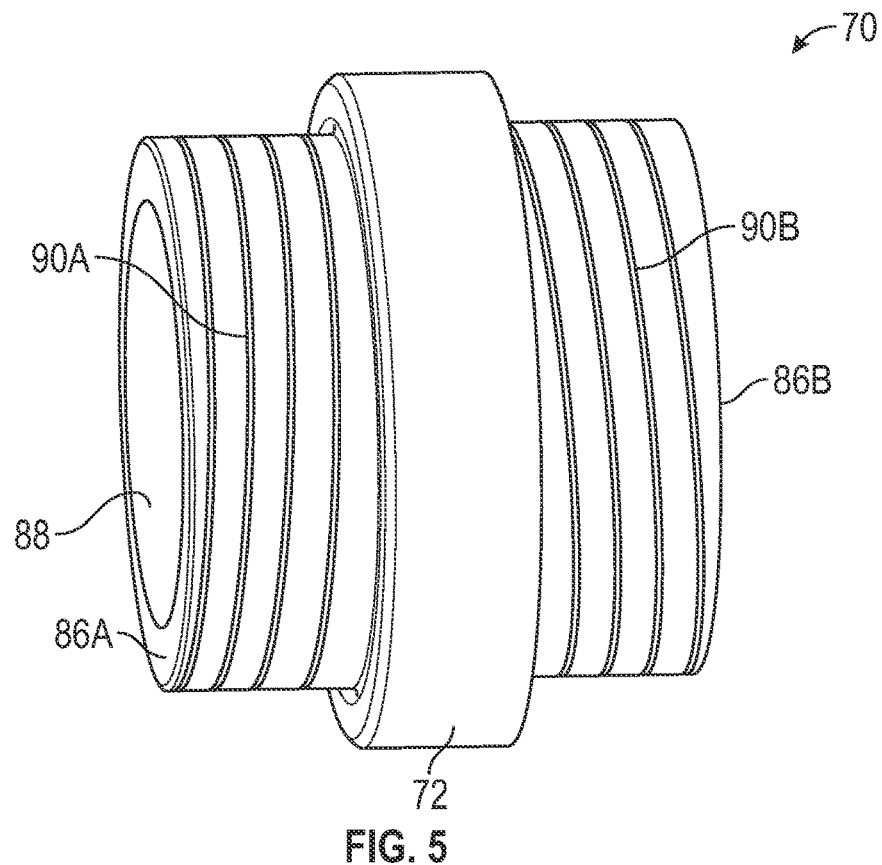
FIG. 5 is a perspective view of a bushing for use in the track shoe of FIGS. 3 and 4 having a bushing outer wall comprising a medial flange and threads.

FIG. 5 is a perspective view of bushing 70 for use in track shoe 38 of FIGS. 3 and 4 having bushing outer wall 82 comprising medial flange 72 and threading 90A and 90B located on first portion 84A and second portion 84B, respectively, of outer wall 82.

Figure 9:
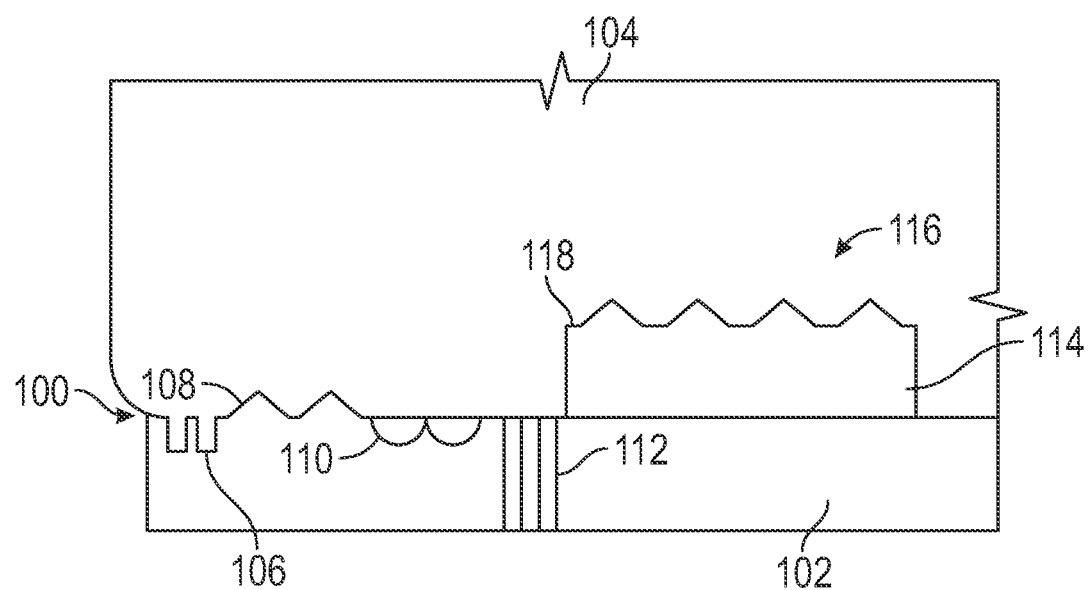
FIG. 9 is a close-up schematic view of an interface between a bushing and a track system component illustrating engagement features of FIGS. 5-8.

In the illustrated example, threading 90A and 90B each comprise a single length of female thread embedded into first portion 84A and second portion 84B. In such an embodiment, threading 90A can extend from first end 86A to flange 72 and threading 90B can extend from second end 86B to flange 72. Threading 90A and 90B can extend in a helical pattern from flange 72 to ends 86A and 86B. In other embodiments, external or male threading can be incorporated. In various embodiments, internal or external threading can extend over less than the entire widths of first portion 84A and second portion 84B. Various types of thread can be used such as single, double or triple thread starts or variable pitch threading. As can be seen in FIG. 9, the threading disclosed herein and variations thereof can form trenches that facilitate interlocking with material of track shoe 38 or another track system component. For example, threading 90A and 90B can permit material of track shoe 38 or another track system component to penetrate into voids within the material of bushing 70 at threading 90A and 90B.

Figure 6:
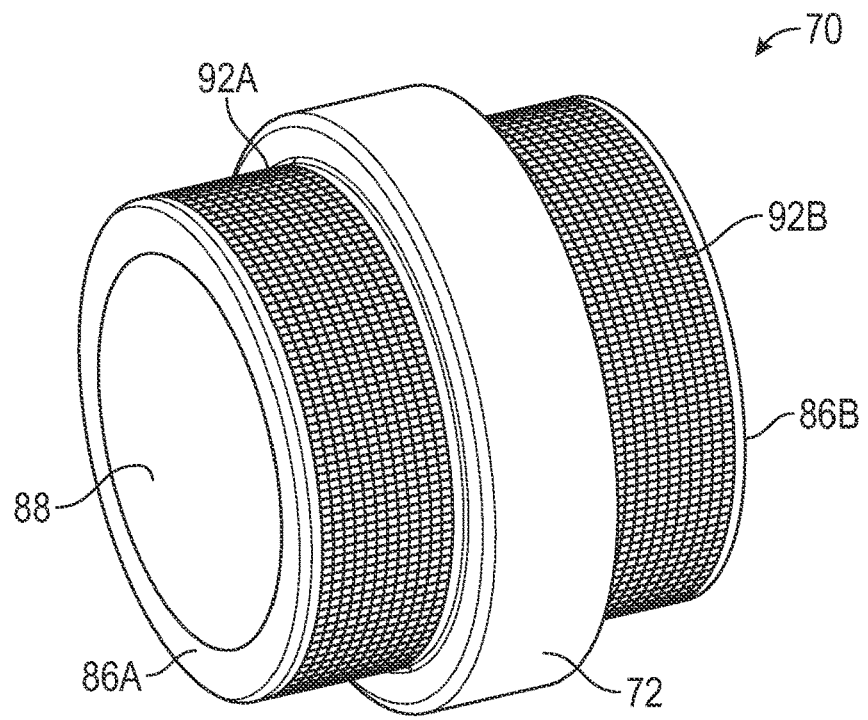
FIG. 6 is a perspective view of a bushing for use in the track shoe of FIGS. 3 and 4 having a bushing outer wall comprising a medial flange and knurling.

FIG. 6 is a perspective view of bushing 70 for use in track shoe 38 of FIGS. 3 and 4 having bushing outer wall 82 comprising medial flange 72 and knurling 92A and 92B located on first portion 84A and second portion 84B, respectively, of outer wall 82.

In the illustrated example, knurling 92A and 92B each comprise an array of projections extending from first portion 84A and second portion 84B, respectively. For example, knurling 92A and 92B can comprise facets of different shapes, pyramid-like shapes, cube-like shapes and the like. Knurling 92A can extend from first end 86A to flange 72 and knurling 92B can extend from second end 86B to flange 72. In various embodiments, knurling 92A and 92B can extend over less than the entire widths of first portion 84A and second portion 84B. As can be seen in FIG. 9, the knurling disclosed herein and variations thereof can form projections that facilitate interlocking with material of track shoe 38 or another track system component. For example, knurling 92A and 92B can permit material of track shoe 38 or another track system component to penetrate into voids between the facets of knurling 92A and 92B within the material of bushing 70.

Figure 7:
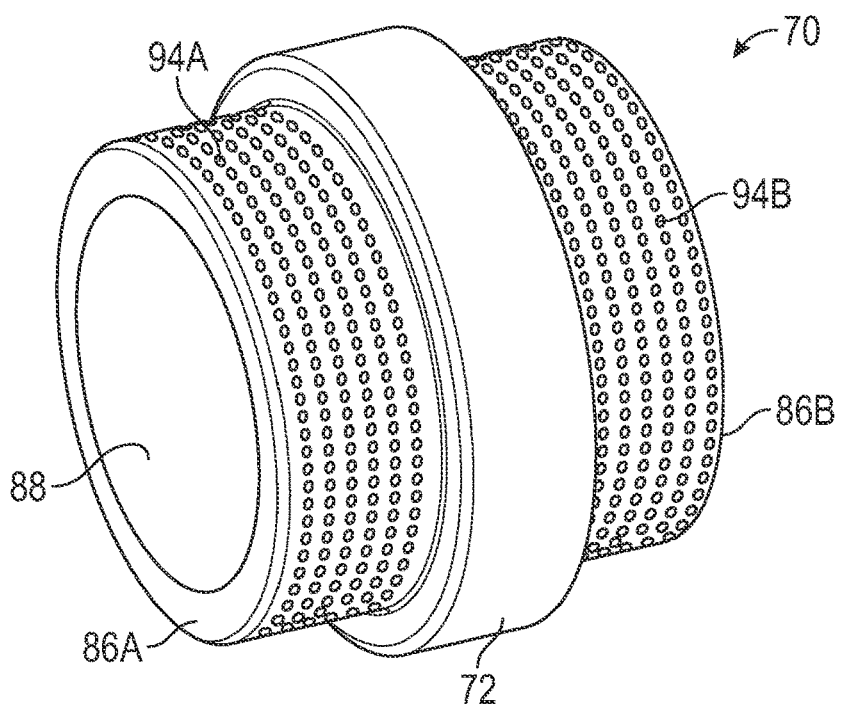
FIG. 7 is a perspective view of a bushing for use in the track shoe of FIGS. 3 and 4 having a bushing outer wall comprising a medial flange and peening.

FIG. 7 is a perspective view of bushing 70 for use in track shoe 38 of FIGS. 3 and 4 having bushing outer wall 82 comprising medial flange 72 and peening 94A and 94B located on first portion 84A and second portion 84B, respectively, of outer wall 82.

In the illustrated example, peening 94A and 94B each comprise an array of indentations extending into first portion 84A and second portion 84B, respectively. For example, peening 94A and 94B can comprise shot peening such that small circular, semi-circular, spherical or semi-spherical indentations can be formed into first portion 84A and second portion 84B. In such an embodiment, peening 94A can extend from first end 86A to flange 72 and peening 94A can extend from second end 86B to flange 72. In various embodiments, peening 94A and 94B can extend over less than the entire widths of first portion 84A and second portion 84B, respectively. As can be seen in FIG. 9, the peening disclosed herein and variations thereof can form depressions that facilitate interlocking with material of track shoe 38 or another track system component. For example, peening 94A and 94B can permit material of track shoe 38 or another track system component to penetrate into voids of the material of bushing 70 formed by peening 94A and 94B.

Figure 8:
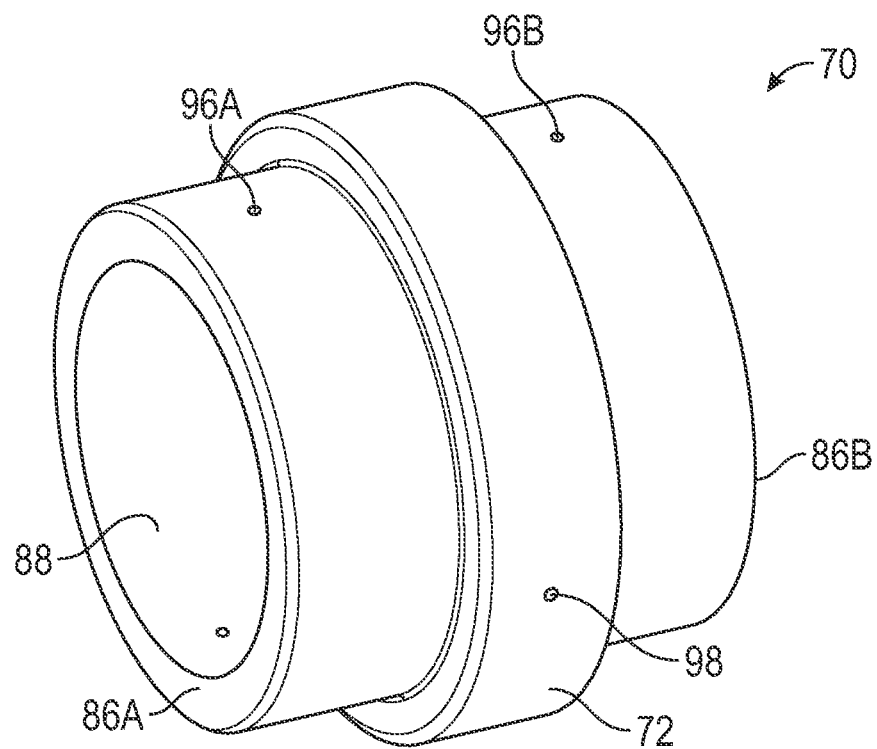
FIG. 8 is a perspective view of a bushing for use in the track shoe of FIGS. 3 and 4 having a bushing outer wall comprising a medial flange and boring.

FIG. 8 is a perspective view of bushing 70 for use in track shoe 38 of FIGS. 3 and 4 having bushing outer wall 82 comprising medial flange 72 and boring 96A and 96B located on first portion 84A and second portion 84B, respectively, of outer wall 82. Additionally, flange 72 can include boring 98.

In the illustrated example, boring 96A and 96B each comprise an array of bores or holes formed into first portion 84A and second portion 84B, respectively. For example, boring 96A and 96B can comprise through bores that extend all the way from outer wall 82 to inner wall 88. In other embodiments, boring 96A and 96B can extend only partially into outer wall 82 and not penetrate to inner bearing surface 88. In the illustrated embodiment, boring 96A and boring 96B can each comprise a single circular array of holes. In other examples, boring 96A and 96B can comprise a plurality of circular arrays of holes spaced apart across the widths of first portion 84A and 84B, respectively. As can be seen in FIG. 9, the boring disclosed herein and variations thereof can form holes that facilitate interlocking with material of track shoe 38 or another track system component. For example, boring 96A and 96B and boring 98 can permit material of track shoe 38 or another track system component to penetrate into voids of the material of bushing 70 formed by boring 96A, 96B and 98.

FIG. 9 is a close-up schematic view of interface 100 between bushing 102 and track component 104 illustrating engagement features 106-112. Bushing 102 can also include flange 114 having engagement features 116. Engagement features 106-112 and 116 can comprise various features that form voids, crevices, open spaces and the like within material of bushing 102.

Engagement feature 106 can comprise internal or female thread channels extending into bushing 102. As such, during a manufacturing process, material of track component 104 can extend into bushing 102 with the thread channels to bond and couple bushing 102 and component 104. In other embodiments, external thread can be used such that material of component 104 can fill-in around a thread projection of bushing 102. Engagement feature 106 can be exemplary of threading 90A and 90B of FIG. 5.

Engagement feature 108 can comprise knurling of bushing 102 that can result in projections extending out of bushing 102. Adjacent engagement features 108 can be spaced apart as shown, but can also be configured to contact each other. As such, during a manufacturing process, material of track component 104 can fill-in around the projections of bushing 102 to bond and couple busing 102 and component 104. Engagement feature 108 can be exemplary of knurling 92A and 92B of FIG. 6.

Engagement feature 110 can comprise peening of bushing 102 that can result in indentions extending into bushing 102. Adjacent engagement features 110 can contact each other as shown, but can also be configured to be spaced apart from each other. As such, during a manufacturing process, material of track component 104 can extend into bushing 102 to bond and couple bushing 102 and component 104. Engagement feature 110 can be exemplary of peening 94A and 94B of FIG. 7.

Engagement feature 112 can comprise boring of bushing 102 that can result in a passage extend into bushing 102. As such, during a manufacturing process, material of track component 104 can extend into bushing 102 to bond and couple bushing 102 and component 104. Engagement feature 112 can be exemplary of boring 96A and 96B of FIG. 8.

Engagement features 116 can comprise any of engagement features 106-112 applied to flange 114. In the example shown, engagement features 116 comprise knurling of flange 114 that results in projections extending out of bushing 102. Engagement features 116 can be located on a radially outer surface of flange 114, as shown, to engage a corresponding surface of channel 118. As such, during a manufacturing process, material of track component 104 can fill-in around the projections of flange 114 to bond and couple bushing 102 and component 104.

Bushing 102 need not include all of the different types of features produced by engagement features 106-112 and 116. In an example, only one of engagement features 106-112 and 116 is used. In other examples, engagement features 106-112 and 116 are mixed and matched.

Figure 10:
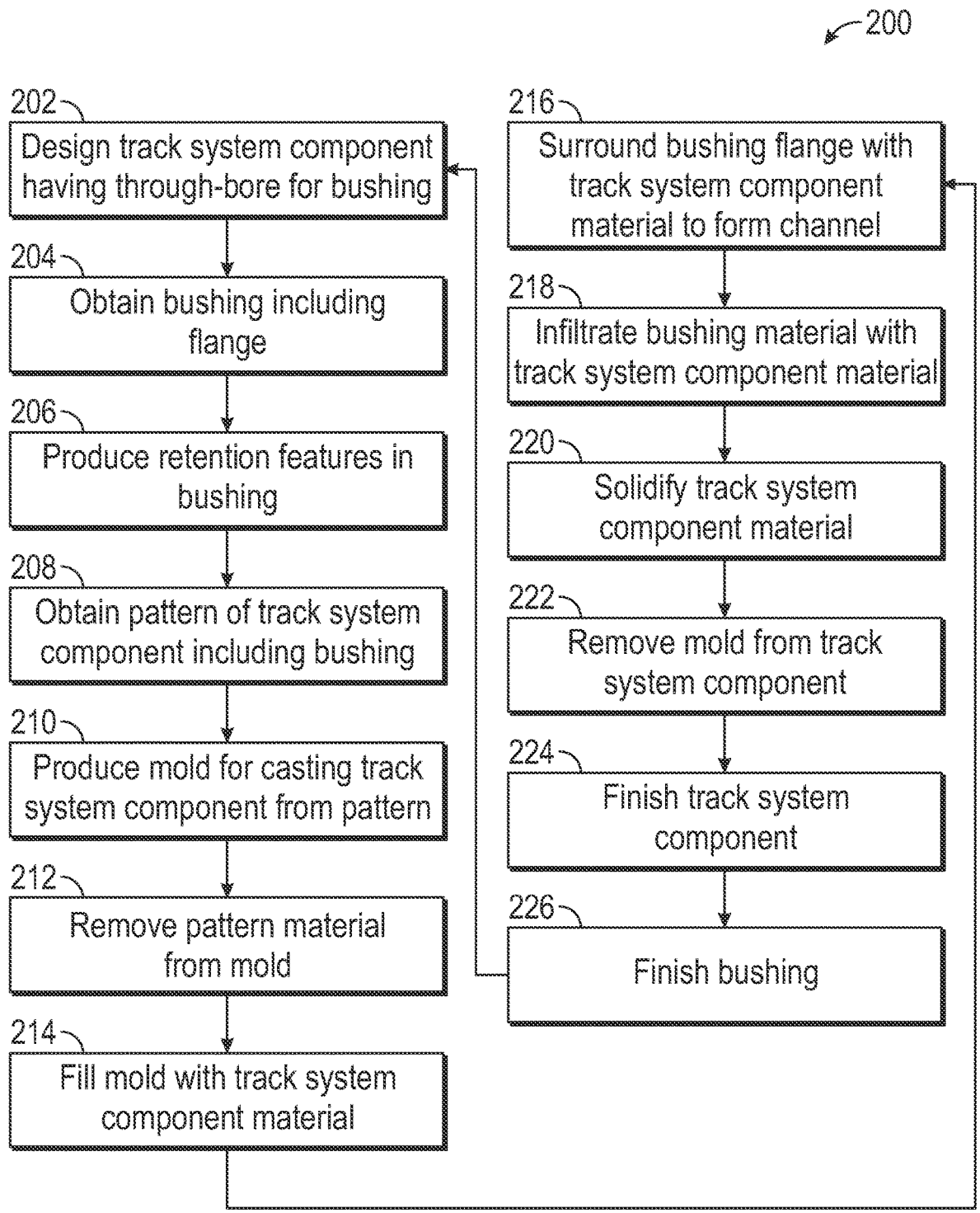
FIG. 10 is a line diagram showing methods for manufacturing a cast-in bushing of the systems and devices of FIGS. 1-9.

FIG. 10 is a line diagram showing method 100 for manufacturing a cast-in bushing 70 of the systems and devices of FIGS. 1-9. Method 100 is discussed as including steps 202-226. However, in other embodiments, not all steps are included and the steps can be performed in other sequences.

At step 202, a track system component including a bushing can be designed. The track system component can comprise a track shoe, a roller or an idler. The track system component can include a through bore that can be attached to another component, such as at a pivoting interface produced by an axle or pin. As such, the track system component can include a bushing to reduce friction and wear at the interface with the axle or pin.

At step 204, a bushing for use within the designed track system component can be obtained. Obtaining of the bushing can include purchasing or manufacturing of the bushing, as well as receiving the bushing from a supplier or an in-house manufacturing process. The bushing can be configured to mate with a through bore of the designed track system component of step 202. The bushing can include a flange for facilitating connection of the bushing to the track system component. Material for the bushing can be selected to have a high melting point and good wear properties. In particular, the bushing material can be selected to have a meting point higher than the melting point of material selected for the track system component so that, for example, the bushing can be cast in place within a pattern for the track system component during a casting process. In an example, the bushing material can be Manganese or a Manganese alloy. In additional examples, the bushing can be made from a ceramic material.

At step 206, retention or engagement features of the bushing can be produced in the bushing, if not already present when obtained at step 204. For example, the engagement features can comprise threading, knurling, peening, boring and the like. For example, threading can be produced by tapping exterior surfaces of the bushing with a tap device, knurling can be produced by a lathe system, peening can be produced with a shot peening process, and boring can be produced with a drilling system.

At step 208, a pattern of the designed track system component can be obtained. Obtaining of the pattern can include purchasing or manufacturing of the pattern, as well as receiving the pattern from a supplier or an in-house manufacturing process. The pattern can be configured to mate with the bushing in the same manner as the designed track system component. For example, the pattern can be a wax pattern, such as for use in an investment casting process.

At step 210, a mold for the designed track system component can be produced from the pattern. For example, the pattern including the bushing attached thereto can be covered in a mold material, such as a ceramic material.

At step 212, material of the pattern can be removed from the mold. For example, after the mold material is solidified or hardened, the pattern material can be heated to above a melting temperature of the pattern material, which can be below a melting temperature of the mold material. As such, the pattern material can be drained from the mold.

At step 214, the mold, which includes the bushing, can be filled with material for the track system component. The material for the track system component can be left to solidify or harden. The material for the track system component can be cast iron in an example. The material for the track system component can be selected to have a lower melting point than material of the bushing. In an example, high carbons steel can be used to produce the track system component. For example, a 32-series Chrome-Nickel-Moly alloy can be used. For illustrative purposes, such steel alloys can have melting temperatures on the order of 1500° F., while Manganese alloys can have melting temperatures on the order of 2300° F. As such, when the mold is filled with hot or molten material for the track system component, the material for the bushing will not melt or become degraded such that the material for the track system component can surround and flow into pores or microstructure for the bushing without compromising the integrity of the bushing.

At step 216, the material for the track system component can surround the flange of the bushing, thereby forming a channel within a through bore of the track system component in which the bushing is disposed. As such, the flange can be immobilized in the channel to secure the bushing to the track system component after solidification at step 220.

At step 218, the material for the track system component can penetrate or infiltrate into bushing material such as at engagement features formed by threading, peening, knurling, boring and the like. As such, projections of bushing material and track component system material can intertwine and interlock to bond or couple the bushing with the track system component.

At step 220, the material for the track system component can be solidified, such as by returning to room or atmospheric temperature, thereby conjoining the bushing with the track system component, particularly the engagement between the engagement or retention features and the flange.

At step 222, the mold can be removed from around the track system component. With the mold removed, the bushing can remain attached to the track system component due, at least in part, to the interlocking that occurs in steps 214-220.

At step 224, the track system component can be finished, such as with appropriate grinding or machining processes to, for example, remove sharp edges from the casting or any flash.

At step 226, the bushing can be finished, such as by producing a smooth bearing surface within the bushing with a polishing process. However, in other embodiments, additional finishing of the bushing is omitted because, for example, all desired machining can be performed at steps 204 and 206.

INDUSTRIAL APPLICABILITY

The present application describes various devices, systems and methods for producing a track system component that incorporate a bushing that are capable of withstanding large loading. In particular, the bushings can withstand large side loading applied to the track components and are better able to resist being loosened or dislodged by such loading. For example, the track system component can comprise a track shoe, roller or idler that is subject to rotational wear, such as on an axel or pin, and side loading, such as by forces that can be generated by an implement such as a bucket.

The bushings can be cast-in-place to facilitate bonding of the bushing to the track component. The bushings can incorporate engagement features to facilitate integration of material of the track component with the bushing. Casting, or otherwise incorporating the bushing into the track component at the time of manufacturing, can facilitate bonding of the track system component and the bushing to resist side loading. Additionally, such a manufacturing process can overcome manufacturing deficiencies associated with press fitting bushings into already manufactured track components. For example, track shoe bushings configured for use with large, hydraulic excavators can require press fit forces that exceed conventional manufacturing capabilities if designed to desirable performance capabilities.

What is claimed is:

1. A track shoe comprising:
a base extending along a transverse direction;
a first link extending from the base in a longitudinal direction, the first link comprising:
  a body connected to the base, the body comprising:
    a first longitudinal wall; and
    a second longitudinal wall;
    wherein the body has a first length extending between the first longitudinal wall and the second longitudinal wall;
  a through bore extending from the first longitudinal wall to the second longitudinal wall; and
  a channel positioned in the through bore spaced from the first longitudinal wall and the second longitudinal wall; and
a bushing located in the through bore, the bushing comprising:
  an outer wall extending between a first end and a second end, the outer wall having a second length between the first end and the second end, wherein the second length is equal to or less than the first length such that the bushing does not extend past the first longitudinal wall and the second longitudinal wall; and
  a flange extending form the outer wall to be positioned in the channel;
wherein the track shoe is monolithic such that the base, the first link including the first longitudinal wall and the second longitudinal wall, the through bore and the channel are connected in a fixed relationship.

2. The track shoe of claim 1, wherein:
the first longitudinal wall and the second longitudinal wall are located on an exterior of the first link; and
the bushing extends all the way from the first longitudinal wall to the second longitudinal wall.

3. The track shoe of claim 1, wherein the bushing comprises Manganese material.

4. The track shoe of claim 1, wherein the bushing comprises:
an outer wall from which the flange extends; and
three-dimensional depressions located on the outer wall adjacent the flange.

5. The track shoe of claim 4, wherein the three-dimensional depressions comprise threading forming trenches.

6. The track shoe of claim 4, further comprising knurling forming the three-dimensional depressions and projections.

7. The track shoe of claim 4, wherein the three-dimensional depressions comprise peening forming depressions.

8. The track shoe of claim 4, wherein the three-dimensional depressions comprise boring forming holes.

9. The track shoe of claim 1, further comprising three-dimensional depressions located on a radially outer surface of the flange.

10. A component for a track-type machine, the component comprising:
a monolithic body comprising:
  a first side wall; and
  a second side wall;
a through bore extending through the body, the through bore including an inner wall extending from the first side wall to the second side wall;
a bushing located in the through bore, the bushing comprising:
  an inner bearing surface;
  an outer surface comprising a first end and a second end, the outer surface engaging the inner wall such that the first end and the second end of the outer surface of the bushing are located between the first side wall and the second side wall;
  a flange comprising:
    a first side wall extending from the outer surface;
    a second side wall extending form the outer surface spaced from the first side wall;
    wherein the first side wall and the second side wall mate with material of the body within the through bore; and
  retention features located in the outer surface proximate the first and second side walls of the flange;
  wherein the retention features comprise voids in the bushing filled-in by material of the body.

11. The component of claim 10, wherein the component is selected from the group consisting of a track shoe, a roller and an idler wheel.

12. The component of claim 11, wherein the retention features are selected from the group consisting of threading, peening, knurling and boring.

13. A track system component comprising:
a bushing comprising:
  a cylindrical body extending from a first end to a second end over a length; and
  an outer diameter flange extending from the cylindrical body between the first end and the second end; and
a through bore extending into longitudinal walls of the track system component;
wherein the track system component is cast with the bushing in place to form the through bore around the bushing and form a channel within the through bore to receive the outer diameter flange such that portions of the outer diameter flange extending beyond the cylindrical body are completely surrounded by material of the track system component and the length of the cylindrical body is completely engaged with material of the track system component on either side of the outer diameter flange such that the bushing does not extend beyond the longitudinal walls of the track system component; and
wherein the track system component comprises a monolithic body such that the through bore and the channel are contiguous surfaces of the material of the track system component.

14. The track system component of claim 13, wherein:
the bushing further comprises three-dimensional depressions located on an exterior surface of the cylindrical body adjacent the flange;
wherein the three-dimensional depressions are infiltrated with track system component material.

15. The track system component of claim 14, wherein the three-dimensional depressions comprise threading located on the exterior surface.

16. The track system component of claim 14, further comprising knurling located on the exterior surface that forms the three-dimensional depressions.

17. The track system component of claim 14, wherein the three-dimensional depressions comprise peening located on the exterior surface.

18. The track system component of claim 14, wherein the three-dimensional depressions comprise boring extending into the exterior surface.

19. The track system component of claim 14, wherein the bushing is made of a bushing mated al having a higher melting point than the track system component material.

20. The track system component of claim 19, wherein the bushing material comprises Manganese and the track system component material is different from the bushing material.

* * * * *